(12) United States Patent
Sivakumar et al.

(10) Patent No.: US 10,885,590 B2
(45) Date of Patent: Jan. 5, 2021

(54) GRANTING ACCESS TO A BLOCKCHAIN LEDGER

(71) Applicant: International Business Machines Corporation, Armonk, NY (US)

(72) Inventors: Gandhi Sivakumar, Melbourne (AU); Faried Abrahams, Laytonsville, MD (US); Krishnan K. Ramachandran, Campbell, CA (US); Anand Pikle, Pune (IN); Amol A. Dhondse, Pune (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/944,866

(22) Filed: Apr. 4, 2018

(65) Prior Publication Data

US 2019/0311437 A1     Oct. 10, 2019

(51) Int. Cl.
*G06Q 40/08* (2012.01)
*G06F 16/27* (2019.01)

(52) U.S. Cl.
CPC ............ *G06Q 40/08* (2013.01); *G06F 16/27* (2019.01)

(58) Field of Classification Search
CPC ..................................................... G06Q 40/08
USPC .......................................................... 705/4
See application file for complete search history.

(56) References Cited

U.S. PATENT DOCUMENTS

| 6,741,168 | B2 | 5/2004 | Webb et al. |
| 7,003,139 | B2 | 2/2006 | Endrikhovski et al. |
| 8,509,987 | B2 | 8/2013 | Resner |
| 8,799,034 | B1 | 8/2014 | Brandmaier et al. |
| 8,825,277 | B2 | 9/2014 | McClellan et al. |
| 9,147,353 | B1 | 9/2015 | Slusar |
| 2002/0055861 | A1 | 5/2002 | King et al. |
| 2003/0156304 | A1 | 8/2003 | Fedorovskaya et al. |
| 2005/0053902 | A1 | 3/2005 | Vladimirovich |

(Continued)

FOREIGN PATENT DOCUMENTS

| EP | 3525498 A1 * | 8/2019 | ............. H04W 4/02 |
| WO | 03/019496 A2 | 3/2003 | |
| WO | 2017/046805 A1 | 3/2017 | |

OTHER PUBLICATIONS

Authors et. al.: Disclosed Anonymously, ip.com, "A method Motor Vehicle Insurance Claim Processing Automation using Simplified Block claim", IPCOM000251638D, Publication Date Nov. 20, 2017, 8 pages. (Year: 2017).*

(Continued)

*Primary Examiner* — Sara C Hamilton
(74) *Attorney, Agent, or Firm* — Nicholas D. Bowman; Hunter E. Webb; Keohane & D'Alessandro, PLLC (57) ABSTRACT

Approaches presented herein enable automatically fulfilling an obligation under a smart contract. A block is added to a blockchain ledger in response to an event that triggers the obligation. The block includes data related to the event. Inferences related to the event are derived based on an analysis of event data and historical data incorporated in prior blocks in the blockchain ledger. Based on the inferences, a potential cause of the event is derived. Based on the potential cause, an interested stakeholder to the fulfilling of the obligation is identified. The interested stakeholder is added to a group that is allowed access to the blockchain ledger corresponding to the smart contract.

20 Claims, 6 Drawing Sheets

(56) References Cited

U.S. PATENT DOCUMENTS

| | | | |
|---|---|---|---|
| 2006/0229505 | A1 | 10/2006 | Mundt et al. |
| 2007/0196809 | A1 | 8/2007 | Sen |
| 2008/0138783 | A1 | 6/2008 | Karkanias et al. |
| 2010/0262573 | A1 | 10/2010 | Abbott et al. |
| 2014/0344015 | A1 | 11/2014 | Puertolas-Montanes et al. |
| 2015/0127570 | A1 | 5/2015 | Doughty et al. |
| 2016/0217532 | A1 | 7/2016 | Slavin |
| 2017/0220998 | A1* | 8/2017 | Horn ................. G06Q 10/10 |
| 2018/0018723 | A1* | 1/2018 | Nagla ............... G06Q 20/388 |
| 2018/0268151 | A1* | 9/2018 | Cuomo .............. H04L 9/3297 |
| 2018/0268152 | A1* | 9/2018 | Cuomo .............. G06N 20/00 |
| 2018/0342036 | A1* | 11/2018 | Zachary ........... G06Q 30/0265 |
| 2019/0034404 | A1* | 1/2019 | Anderson ......... G06F 40/186 |
| 2019/0129994 | A1* | 5/2019 | Astigarraga ...... G06F 16/2425 |
| 2019/0163887 | A1* | 5/2019 | Frederick ............. G06F 21/64 |
| 2019/0166133 | A1* | 5/2019 | Frederick ............ H04L 63/061 |
| 2019/0180276 | A1* | 6/2019 | Lee ...................... H04L 63/10 |
| 2019/0182257 | A1* | 6/2019 | Lee ................. G06Q 10/06315 |
| 2019/0279227 | A1* | 9/2019 | Chantz ................. H04W 4/44 |
| 2019/0287026 | A1* | 9/2019 | Calmon .............. H04L 9/3239 |
| 2019/0303463 | A1* | 10/2019 | Catalano ............. G06F 16/487 |
| 2019/0303932 | A1* | 10/2019 | Klaedtke ............. G06Q 20/22 |
| 2019/0305957 | A1* | 10/2019 | Reddy .................. G06F 21/51 |
| 2019/0306173 | A1* | 10/2019 | Reddy .................. G06F 11/00 |

OTHER PUBLICATIONS

Wang et al., "Blockchain is empowering the future of insurance", https://techcrunch.com/2016/10/29/blockchain-is-empowering-the-future-of-insurance/, Oct. 29, 2016, 3 pages.

Dorri et al., "BlockChain: A Distributed Solution to Automotive Security and Privacy", Sep. 29, 2017, accepted to be published in IEEE Communications Magazine, 7 pages.

Gipp et al., "Securing Video Integrity Using Decentralized Trusted Timestamping on the Bitcoin Blockchain", Mediterranean Conference on Information Systems, MCIS 2016 Proceedings, 11 pages.

Paperno et al., "Teambrella: A Peer-to-Peer Insurance System", Teambrella White Paper 2015, https://teambrella.com/whitepaper.pdf, 17 pages.

Authors et al.: Disclosed Anonymously, ip.com, "A secure method of recording the history of a vehicle to a blockchain", IP.com No. IPCOM000250889D, Publication Date Sep. 12, 2017, 6 pages.

Authors et al.: Disclosed Anonymously, ip.com, "Mechanism to Preserve Audit History Record for Insurance Claim using Blockchain Smart Contract", IP.com No. IPCOM000247099D, Publication Date Aug. 5, 2016, 7 pages.

Authors et al.: IBM, ip.com, "Wireless Transfer of Automobile Owner Information During Critical Situations", IP.com No. IPCOM000152674D, Publication Date May 9, 2007, 4 pages.

Ying Li et al., "Applying Image Analysis to Auto Insurance Triage: A Novel Application", Copyright 2007 IEEE, pp. 280-283.

Habib M. Fardoun et al., "Improving User-Insurance Communication on Accident Reports", Interaccion '14, Sep. 10-12, 2014, Puerto de la Cruz, Tenerife, Spain, Copyright 2014 ACM, 6 pages.

Benjamin Leiding et al., "Self-managed and Blockchain-based Vehicular Ad-hoc Networks", UBICOMP/ISWC '16 Adjunct, Sep. 12-16, 2016, Heidelberg, Germany, pp. 137-140.

Andrew J. Blumberg et al., "Automated Traffic Enforcement Which Respects Driver Privacy", Published in: Intelligent Transportation Systems, 2005, Proceedings 2005 IEEE, 6 pages.

* cited by examiner

| $X_i$ | PREDICTOR VARIABLE | RATING PARAMETER(S) |
|---|---|---|
| $X_1$ | VEHICLE SPEED | WITHIN OPTIMAL RANGE |
| $X_2$ | IMPACT SEVERITY | DISCREET CLASSES REPRESENTING NATURE OF THE INCIDENT, SUCH AS "SIDEWALK OVER-RUN", ETC. |
| $X_3$ | VEHICLE HEALTH | DERIVED COMPOSITE SCORE BASED ON ON-TIME SERVICE HISTORY, ETC. |
| $X_4$ | ROAD LOCATION CONDITION | DERIVED COMPOSITE SCORE BASED ON SLOPE, PRESENCE OF OIL/GRAVEL, ETC. |
| $X_5$ | WEATHER CONDITION | DERIVED COMPOSITE SCORE BASED ON LEVEL OF PRECIPITATION, SNOW, ETC. |
| $X_6$ | REAL-TIME TRAFFIC DENSITY | REPRESENTED IN TERMS OF VARIATION FROM MEAN TRAFFIC DENSITY |
| $X_7$ | TYRE HEALTH | DERIVED COMPOSITE SCORE BASED ON TEMPERATURE, PRESSURE, ETC. |
| $X_8$ | DRIVER HEALTH | DERIVED COMPOSITE SCORE BASED ON LAST HEALTH CHECK-UP, ETC. |
| $X_9$ | DRIVER HISTORICAL SCORE | DERIVED COMPOSITE SCORE BASED ON PREVIOUS INCIDENTS, CLAIMS, ETC. |
| $X_{10}$ | ENGINE CONDITION | DERIVED COMPOSITE SCORE BASED ON ENGINE TEMPERATURE, ETC. |
| $X_{11}$ | LOCAL INTERFERENCE | DERIVED COMPOSITE SCORE BASED ON CROSSING PEDESTRIANS, ANIMALS, ETC. |

GRANTING ACCESS TO A BLOCKCHAIN LEDGER

TECHNICAL FIELD

The subject matter of this invention relates generally to a smart contract. More specifically, aspects of the present invention provide a solution for analyzing blocks in a blockchain ledger following an event to identify an interested stakeholder from among potential stakeholders and granting, based on the analysis, the interested stakeholder access to the blockchain ledger.

BACKGROUND

Blockchain refers to a distributed ledger where a list of transactions is stored in multiple participating servers rather than on a central transaction server. Each participant in the blockchain network is granted access to an up-to-date copy of this encrypted ledger so they can read, write, and validate transactions.

Originally developed as the accounting method for virtual currency, blockchains are now appearing in a variety of commercial applications today. It is possible to digitize, code, and insert practically any document into a blockchain. Doing so creates an indelible record that cannot be changed. Furthermore, the record's authenticity can be verified by the entire community having access to the blockchain instead of a single centralized authority.

SUMMARY

In general, embodiments of the present invention enable automatically fulfilling an obligation under a smart contract. A block is added to a blockchain ledger in response to an event that triggers the obligation. The block includes data related to the event. Inferences related to the event are derived based on an analysis of event data and historical data incorporated in prior blocks in the blockchain ledger. Based on the inferences, a potential cause of the event is derived. Based on the potential cause, an interested stakeholder to the fulfilling of the obligation is identified. The interested stakeholder is added to a group that is allowed access to the blockchain ledger corresponding to the smart contract.

One aspect of the present invention includes method for automatically fulfilling an obligation under a smart contract, the method comprising: adding, in response to an event that triggers the obligation, a block to a blockchain ledger, wherein the block includes data related to the event; deriving, based on an analysis of event data and historical data incorporated in prior blocks in the blockchain ledger, one or more inferences related to the event; determining, based on the one or more inferences, a potential cause of the event; identifying, based on the potential cause, an interested stakeholder to the fulfilling of the obligation among potential stakeholders; and adding the interested stakeholder to a group that is allowed access to the blockchain ledger corresponding to the smart contract.

Another aspect of the present invention includes a computer program product embodied in a computer readable medium that, when executed by a computer device, performs a method for automatically fulfilling an obligation under a smart contract, the method comprising: adding, in response to an event that triggers the obligation, a block to a blockchain ledger, wherein the block includes data related to the event; deriving, based on an analysis of event data and historical data incorporated in prior blocks in the blockchain

2 ledger, one or more inferences related to the event; determining, based on the one or more inferences, a potential cause of the event; identifying, based on the potential cause, an interested stakeholder to the fulfilling of the obligation among potential stakeholders; and adding the interested stakeholder to a group that is allowed access to the blockchain ledger corresponding to the smart contract.

Yet another aspect of the present invention includes a system for automatically fulfilling an obligation under a smart contract, comprising: a memory medium comprising instructions; a bus coupled to the memory medium; and a processor coupled to the bus that when executing the instructions causes the system to perform a method, comprising: adding, in response to an event that triggers the obligation, a block to a blockchain ledger, wherein the block includes data related to the event; deriving, based on an analysis of event data and historical data incorporated in prior blocks in the blockchain ledger, one or more inferences related to the event; determining, based on the one or more inferences, a potential cause of the event; identifying, based on the potential cause, an interested stakeholder to the fulfilling of the obligation among potential stakeholders; and adding the interested stakeholder to a group that is allowed access to the blockchain ledger corresponding to the smart contract.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context. As used herein, the terms "user" and "consumer" are used interchangeably and refer to an individual who has opted in to receiving local inventory notifications.

As stated above, embodiments of the present invention enable automatically fulfilling an obligation under a smart contract. A block is added to a blockchain ledger in response to an event that triggers the obligation. The block includes data related to the event. Inferences related to the event are derived based on an analysis of event data and historical data incorporated in prior blocks in the blockchain ledger. Based on the inferences, a potential cause of the event is derived. Based on the potential cause, an interested stakeholder to the fulfilling of the obligation is identified. The interested stakeholder is added to a group that is allowed access to the blockchain ledger corresponding to the smart contract.

As used herein, the term "smart contract" is a computer protocol intended to digitally facilitate, verify, or enforce a negotiation or performance of a contract. Smart contracts allow the performance of credible transactions without third parties. These transactions are trackable and irreversible. Proponents of smart contracts claim that many kinds of contractual clauses may be made partially or fully self-executing, self-enforcing, or both. The aim of smart contracts is to provide security that is superior to traditional contract law and to reduce other transaction costs associated with contracting. Today, based on blockchains, "smart contract" is typically used more specifically in the sense of general purpose computation that takes place on a blockchain. In this interpretation, a smart contract is not necessarily related to the classical concept of a contract, but can be any kind of computer program.

As stated, a blockchain provides the means for recording transactions in a shared ledger. This shared ledger can be used to record any transaction and track the movement of any asset whether tangible, intangible, or digital. For example, blockchain enables securities to be settled in minutes instead of days. It can also be used to help companies manage the flow of goods and related payments, or enable manufacturers to share production logs with original equipment manufacturers (OEMs) and regulators to reduce product recalls. Though blockchains can be used in any number of business operations, this disclosure focuses, as an exemplary example, on managing blockchain ledger access related to an insurance policy following a vehicle incident or event, such as a traffic collision which may trigger a related insurance claim.

A traffic collision, also called a motor vehicle collision (MVC) among other terms, occurs when a vehicle collides with another vehicle, pedestrian, animal, road debris, or other stationary obstruction, such as a tree, pole, or building. Traffic collisions can result in injury, death, and/or property damage. A number of factors may contribute to the risk of collision, including vehicle design, speed of operation, road design, road environment, and driver skill, and/or behavior such as speeding, street racing, etc.

Many traffic collisions result in an insurance claim by at least one party involved in the event. Processing an insurance claim following a traffic collision can be a complex and time-consuming process. Individuals involved in the event must exchange insurance information and file insurance claims. Insurance companies for the individuals involved in the event may determine the amount of damage caused to the vehicles, pay out on insurance claims, and recover damages from the liable party. Further, information related to the traffic collision may need to be shared with one or more interested stakeholders or parties, such as multiple insurance agents, claims adjusters, subrogation representatives, and the like.

Using a blockchain ledger in this context enhances an insurance industry's recordkeeping and reporting capabilities, as well as its governance structure. The proposed mechanism gives interested stakeholders the ability to access the blockchain ledger. All interested stakeholders involved in the event and/or claim processing can then be kept up to date in matters related to the event. Further, the methods described herein provide the ability to identify a potential cause of the event and provide an output (e.g., write-up, video, etc.) as part of the blockchain. As stated, the approaches described herein provide a seamless way for analyzing blocks in a blockchain ledger following an event to identify an interested stakeholder from among potential stakeholders and granting, based on the analysis, the interested stakeholder access to the blockchain ledger.

Figure 1:
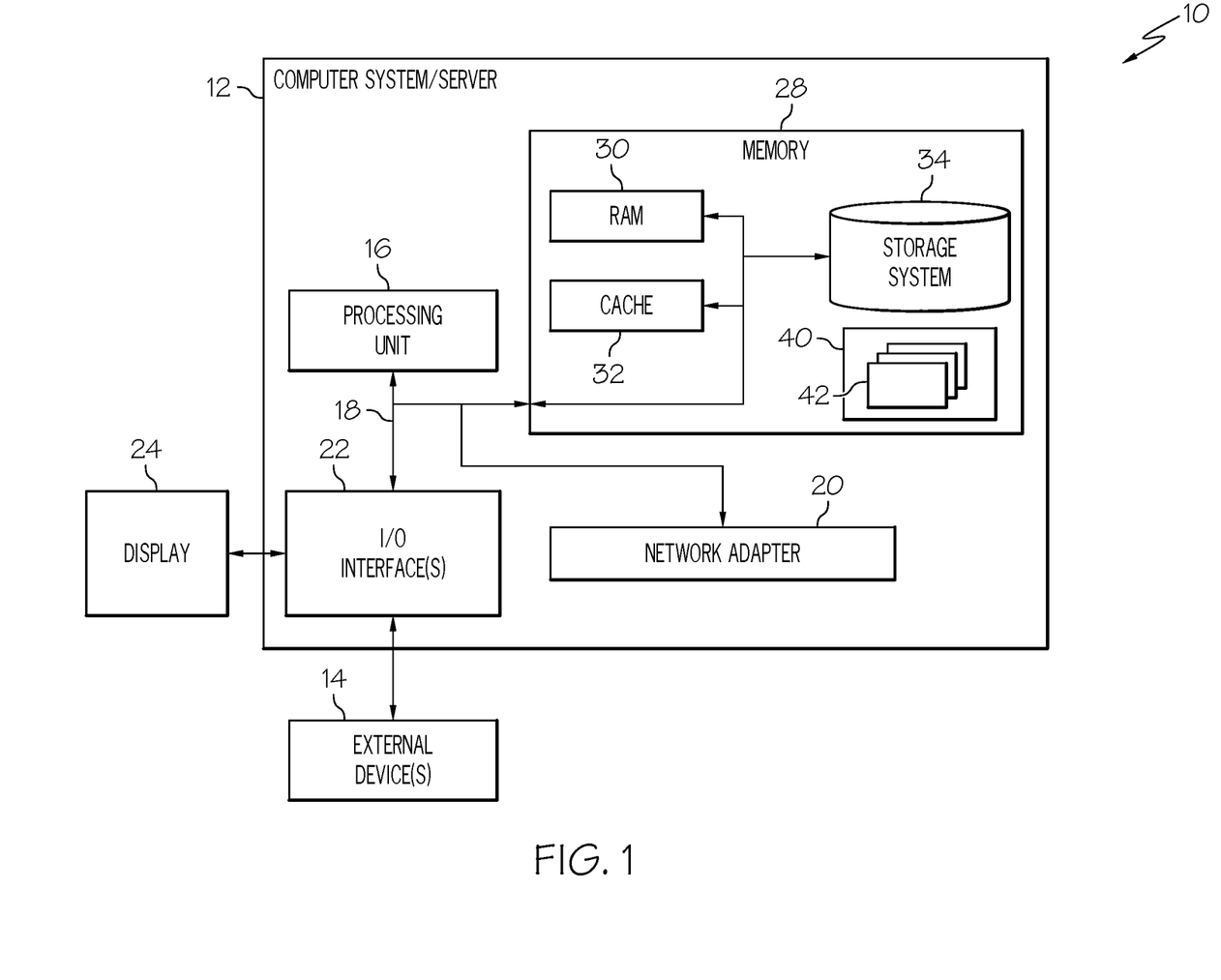
FIG. 1 shows an architecture 10 in which the invention may be implemented according to an illustrative embodiment of the present invention.

Referring now to FIG. 1, a computerized implementation 10 of an embodiment for analyzing blocks in a blockchain ledger following an event to identify an interested stakeholder from among potential stakeholders and granting, based on the analysis, the interested stakeholder access to the blockchain ledger will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system analyzing blocks in a blockchain ledger following an event to identify an interested stakeholder from among potential stakeholders and granting, based on the analysis, the interested stakeholder access to the blockchain ledger. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for analyzing blocks in a blockchain ledger following an event to identify an interested stakeholder from among potential stakeholders and granting, based on the analysis, the interested stakeholder access to the blockchain ledger, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
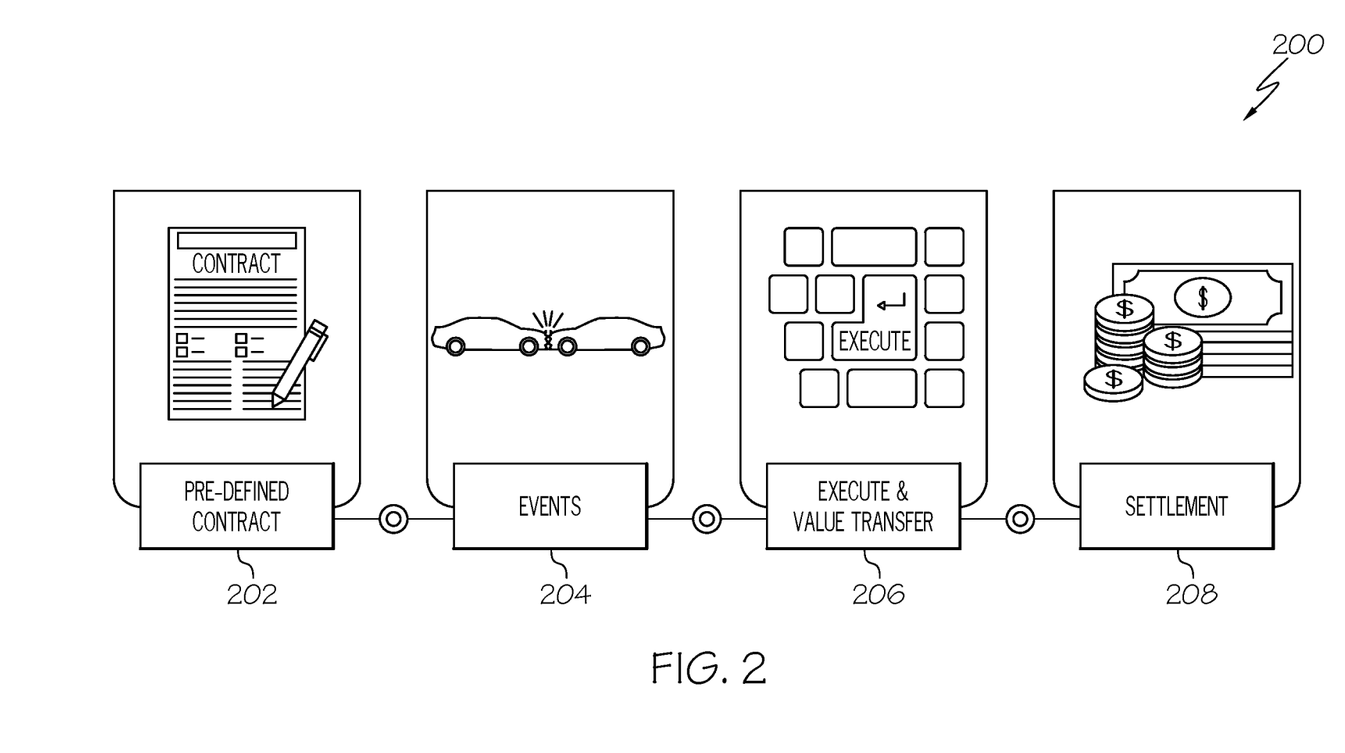
FIG. 2 shows a flow diagram 200 for an example smart contract according to an illustrative embodiment of the present invention.

FIG. 2 shows an example smart contract flow diagram 200 involving an automobile insurance policy. In insurance, an insurance policy is a contract (generally a standard form contract) between the insurer and the insured, known as the policyholder, which determines the claims which the insurer is legally required to pay. In exchange for an initial payment, known as a premium, the insurer promises to pay for loss caused by perils covered under the policy language. The insured and the insurer each currently have issues that blockchain and smart contracts could solve. Insured individuals typically find insurance contracts long and confusing while the insurance companies are consistently having to battle issues with fraud.

Through blockchain and smart contracts, both parties may benefit from managing claims in a responsive and transparent way. Contracts can be recorded and verified on the blockchain so that, when a claim is submitted, the blockchain could ensure that only valid claims are paid. The network would know if there were multiple claims submitted for the same accident. When certain criteria are met, a blockchain could trigger payment of the claim without any human intervention, therefore improving the speed of resolution for claims.

As shown, at 202, terms of an automobile insurance policy are agreed upon by all parties to the contract. The terms are hardcoded into a smart contract and cannot be changed without the knowledge of all parties. At 204, an event, such as a traffic collision, triggers insurance policy execution. At 206, the smart contract policy is automatically executed based on the pre-agreed terms. At 208, a payout or other type of settlement is completed instantly and efficiently.

Figure 3:
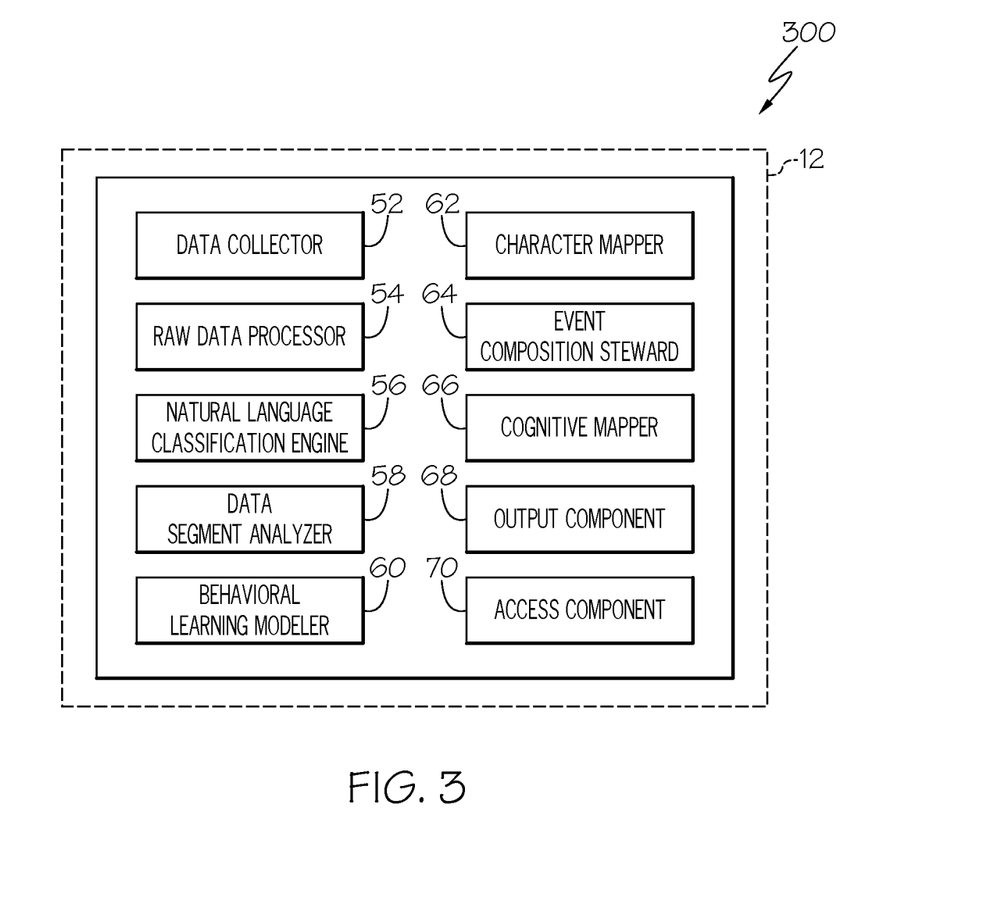
FIG. 3 shows a schematic diagram 300 illustrating an exemplary environment for implementation according to an illustrative embodiment of the present invention.

Referring now to FIG. 3, a block diagram 300 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a smart contract mechanism 50 (hereinafter "system 50"). Rather, system 50 could be loaded on a server or server-capable device that communicates (e.g., wirelessly) with the physical server to analyze blocks in a blockchain ledger following an event to identify an interested stakeholder from among potential stakeholders and granting, based on the analysis, the interested stakeholder access to the blockchain ledger.

Data collector 52 of system 50, as executed by computer system/server 12, is configured to collect data related to a driver's behavior relative to a particular vehicle. The collected data may include, in response to an event, data related to event. As used herein, the vehicle could represent a car, a truck, a van, a semi-trailer truck, a motorcycle, a golf cart, an off-road vehicle, or a farm vehicle, among other examples. Data collector 52 may gather data from any number of sources, such as automobile sensors, telemantic boxes, smart phone sensor data, monitoring cameras, and the like. Modern automobiles can contain hundreds or even thousands of sensors, measuring everything from fuel level to the current slope of the road. These sensors are often used to help the car adapt to the current environment (i.e., stopping suddenly when about to hit an object). With these sensors, a driving style may be identified and one or more driving patterns may be uncovered.

Data collector 52 may also collect data from a telemantics device. A telemantics device is a device which may be installed in an automobile to record information about driving habits, such as the number of miles driven, automobile speed, aggressive breaking, aggressive acceleration, and the like. These systems may also analyze the time of day the automobile is driven. These devices are now being used by some insurance companies to incentive drivers to drive more carefully in exchange for an insurance discount. Typically, this device is a small piece of hardware that plugs into an automobile's OBD-II port. On-board diagnostics (OBD) is an automotive term referring to a vehicle's self-diagnostic and reporting capability. In addition, an OBD-II-based tracker may be capable of finding, storing, and transmitting any bit of data in the automobile's computer.

Data collector 52 may also collect sensor data from one or more smartphones in the automobile. Today's smartphones and mobile devices typically embed advanced motion sensors. Smart phone sensors including an accelerometer, gyroscope, magnetometer, Global Positioning System (GPS), camera, microphone, and/or the like may be used to gather information related to a driver's behavior. For example, an accelerometer and orientation sensor may be used to detect a dangerous vehicle maneuver (e.g., weaving, drifting, swerving, turning with a wide radius, accelerating or decelerating suddenly, braking erratically, driving with tires on center on lane marker, driving without headlights at night, etc.) which may be indicative of an impaired or careless driver. Further, GPS data may reveal that a driver is based in a hot weather city such as Phoenix, but travels to snowy areas frequently during the winter.

Data collector 52 may also receive data from one or more in-vehicle cameras installed in the automobile. A variety of vision technologies may be used to detect distracted and drowsy driving, as well as to discern driver position. These systems may use several conventional two-dimensional (2D) cameras located at different position in the dashboard, a single three-dimensional (3D) camera, or a combination of these approaches. The cameras can capture facial analysis information, which can be processed by an engine control unit (ECU) or other computing resources in the automobile to implement driver gaze tracking (i.e., assessing a degree of attention on the road ahead) as well as provide feedback on head and body position, blink frequency and duration, and intensity of redness in the eyes. These data points are then combined to determine if the driver is distracted or drowsy and may provide an alert (noise, etc.) to the driver when necessary.

Data collector 52 may be further configured to collect data-related road, traffic, and/or weather conditions while an automobile is being driven. In an example, road condition data may be sourced from a smartphone-based data collection system which may provide accurate and timely mico-level road condition data. In addition, a smartphone or on-board GPS system may provide traffic data from any number of mapping and traffic applications. Drivers using mapping applications receive information about traffic jams because the mapping companies receive anonymous data from all the cell phones in the area about the speed of the vehicle driving in that area. Mapping companies match the reported speed with the posted speed limits for that area and color code their maps to show drivers where there are traffic backups or jams. Smartly, weather data may be collected from a smartphone weather application.

Raw data processor 54 of system 50, as executed by computer system/server 12, is configured to filter and normalize the collected data from multiple sources into a structured taxonomy which may be used for further analysis. Raw data processor 54 may filter out any collected data not related to the particular driver/automobile combination. For example, any collected data gathered for a different driver may be disregarded. Additional information related to the driver and/or automobile may be collected to augment the already gathered data from any relevant internal or external sources, such as commercial and/or non-commercial entities including legal and/or regulatory sources, etc. Data collected may be received in any useful format including textual, video, audio, photographic, etc.

For example, raw data processor 54 may gather automobile health data such as maintenance records, vehicle age, number of miles driven, etc. For example, maintenance records (e.g., tune-ups, oil changes, etc.) may be gathered for the automobile from one or more automotive maintenance providers. Collected maintenance records may be used to determine whether all scheduled maintenance has been performed and whether performed in a timely manner. The maintenance records may also indicate tire health (e.g., date of latest tire change or rotation, etc.), engine health (e.g., any issues detected/corrected), and the like. Further, information such as owner licensing, age of vehicle, etc., may be collected from a department of motor vehicles.

Raw data collector 54 may further be configured to process and transform collected data including information from location-specific sources (e.g., using collected weather data, camera data, etc.) into a cohesive knowledge base at an appropriate level of aggregation. The knowledge base may be any centralized repository, such as one or more relational databases. The knowledge base may be associated to suitable dimensions, such as time and geo-coordinates which provides a context for driving behavior at specific locations including weather, road conditions, traffic patterns, vehicle health condition, and/or the like at particular dates/times. The contextual data stored in the knowledge base can be used to derive a context when a later driving event occurs.

Natural language classification engine 56 of system 50, as executed by computer system/server 12, is configured to use natural language interpretation and classification capabilities on structured and unstructured data to perform a user characteristic to action mapping. Natural language processing (NLP) techniques help computers understand, interpret, and manipulate human language. NLP draws from many disciplines, including computer science and computational linguistics, in its pursuit to fill any gaps between human communication and computer understanding. Natural language classification engine 56 uses natural language processing to map captured textual, audio, and/or video information to relevant attributes that qualify the situation and can be tagged to a sequence of events. For example, assume a pedestrian steps out behind a parked car causing a driver (e.g., "Bruce") to swerve and collide with a street sign. Further assume that an on-board camera captures video showing the pedestrian stepping out from behind the parked vehicle. Natural language classification engine 56 can tag frames of the video showing the pedestrian with keywords such as "unexpected obstacle", "sight obstruction", "life hazard", etc., adding context to the event.

Data segment analyzer 58 of system 50, as executed by computer system/server 12, is configured to correlate a behavior analysis with conditions related to a vehicle event, such as a traffic collision, to gain insights into the event. To that end, data segment analyzer 58 may apply behavior analytics techniques to reveal insights into the behavior of the driver regarding a vehicle event. The behavioral analysis may focus on understanding how the driver acts and why, enabling accurate predictions about how the driver acted during the event. The techniques used may take a holistic and human view of data, connecting collected, individual data points to determine not only what is happening during the event, but also how and why it is happening. For example, the analysis may yield that "Bruce was unfocused or distracted which led to the event", etc.

Behavioral learning modeler 60 of system 50, as executed by computer system/server 12, is configured to perform a cognitive analysis on the processed data related to a driver to derive one or more inferences about the event. Cognitive analytics can refer to a range of different analytical strategies that are used to learn about events. Certain types of cognitive analytics also may be known as predictive analytics, where data mining and other cognitive uses of data can lead to predictions related to the event. Using these techniques to self-learn from historical data, behavioral learning modeler 60 may hypothesize possible situations that may have occurred. For example, a derived inference may, based on collected data, state: "the intersection may have been slippery as there was some oil spillage and it had rained the previous hour."

Character mapper 62 of system 50, as executed by computer system/server 12, is configured to leverage insights from user activities to build profile characteristics of the user to derive one or more behavioral inferences. Using cognitive techniques, character mapper 62 may build a behavioral profile of the driver based on past interactions and events. For example, the profile may conclude: "Bruce is typically an alert and rule-abiding driver during the day, but may be prone to occasional drowsy driving at night, and it was late when the event occurred."

Event composition steward 64 of system 50, as executed by computer system/server 12, is configured to compose a structured and time-sequenced series of inferences about the event across multiple dimensions such as road condition, visibility, human distraction, etc. including a potential cause of the event. Event composition steward 64 attempts to stitch together a logical sequence of events based on collected data and inferred information to form a cohesive depiction about happenings during a certain span of time related to the traffic event.

Cognitive mapper 66 of system 50, as executed by computer system/server 12, is configured to identify any outliers or anomalous data points in the inferred information about the determined sequence of events. The presence of outliers may affect the validity and robustness of any conclusions related to the inferred information regarding the event. In an embodiment, cognitive mapper 66 may determine expected behavior of the driver in "normal" conditions while adhering to any regulatory and/or legal requirements and guidelines to determine outliers. In another embodiment, any outlier detection algorithm now known or later developed may be used for identification.

In the presence of outliers, one approach is to simply discard the outliers while other approaches seek to eliminate outliers through additional analysis. One approach is to replace outliers with the nearest "nonsuspect" data. In another approach, if a data point is found to be an outlier, it is removed from the data set and the analysis can be applied again to determine a new set of inferences. This process may be continued until no outliers remain. In any case, any outliers in the inferred information may be accounted for when testing a validity of the determined sequence of events related to the traffic event.

Output component 68 of system 50, as executed by computer system/server 12, is configured to create an output depicting the determined sequence of events related to the traffic event. The output may include video, photographs, text, computer simulation, and/or any combination of each. In an embodiment, the output may include a video augmented with a computer simulation, text, photographs, and/or the like, depicting the sequence. The output (e.g., video) may reconstruct the event including a span of time before and after the event. For example, the output may depict Bruce's journey including the 10 minutes prior and 10 minutes after the traffic event involving him. The output may include any inferred information and/or any anomalies. In another embodiment, a different output format may be used. In any case, output component 68 creates an output showing the determined sequence of events related to the event/incident.

Access component 70 of system 50, as executed by computer system/server 12, is configured to identify an interested stakeholder from among potential stakeholders and grant the interested stakeholder access to a blockchain ledger. As stated earlier, data relevant to an event may be captured including information from vehicle sensors, camera(s), etc., along with local traffic density, road condition, weather, etc. The captured data, together with historical data, may be identified for a given event i to generate a new block in a blockchain, as described below.

Figure 4:
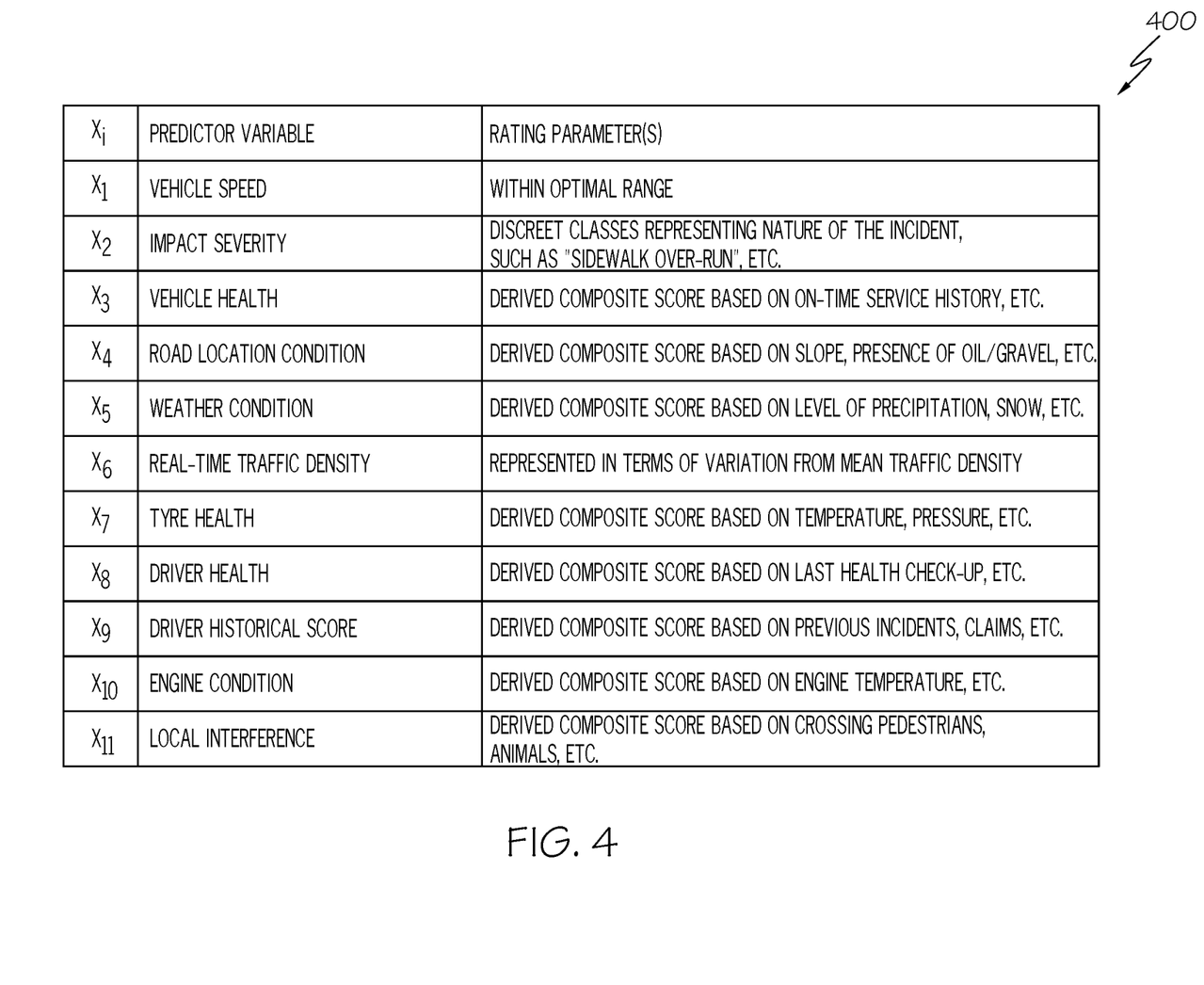
FIG. 4 shows an example event profile table 400 according to an illustrative embodiment of the present invention.

Data captured for the event and historical data may be combined to form an event profile table. FIG. 4 shows an example event profile table 400. As shown, attributes are stated as per related rating parameters. Attributes shown may be exposed from dimensions of a driver profile which can be used for any necessary processing, including identifying interested stakeholders. As used herein, a "stakeholder" may include one or more of the following parties: a vehicle owner, vehicle insurer, traffic police, local body administration, life insurer, car manufacturer, parts manufacturer, servicing agency, rental agency, driver agency, and/or the like. Information regarding the event may be enhanced every time a similar event occurs by analyzing the influence across all the predictor variables. For each prospective stakeholder, access component 70 may determine if the event is of interest based on a suitable learning model. An example learning model is described below.

In an embodiment, a probability of the event being of interest to a particular stakeholder can be represented by the following equation (Eq. 1): $\rho(E_i) \in [0,1]$, such that $E_i$ represents the event and the output is zero or one depending on whether a stakeholder is deemed an interested party or not. The equation can be shown as an inverse S-shaped curve probability logit function, as illustrated in graph 500 of FIG. 5. From the logit transformation, the following equation (Eq. 2) can be derived: $\rho(E_i) = e^{(a+b \cdot E_i)}/(1+e^{(a+b \cdot E_i)})$, where a and b are parameters that must be estimated to fit the historical win/loss data using maximum-likelihood estimates.

Figure 5:
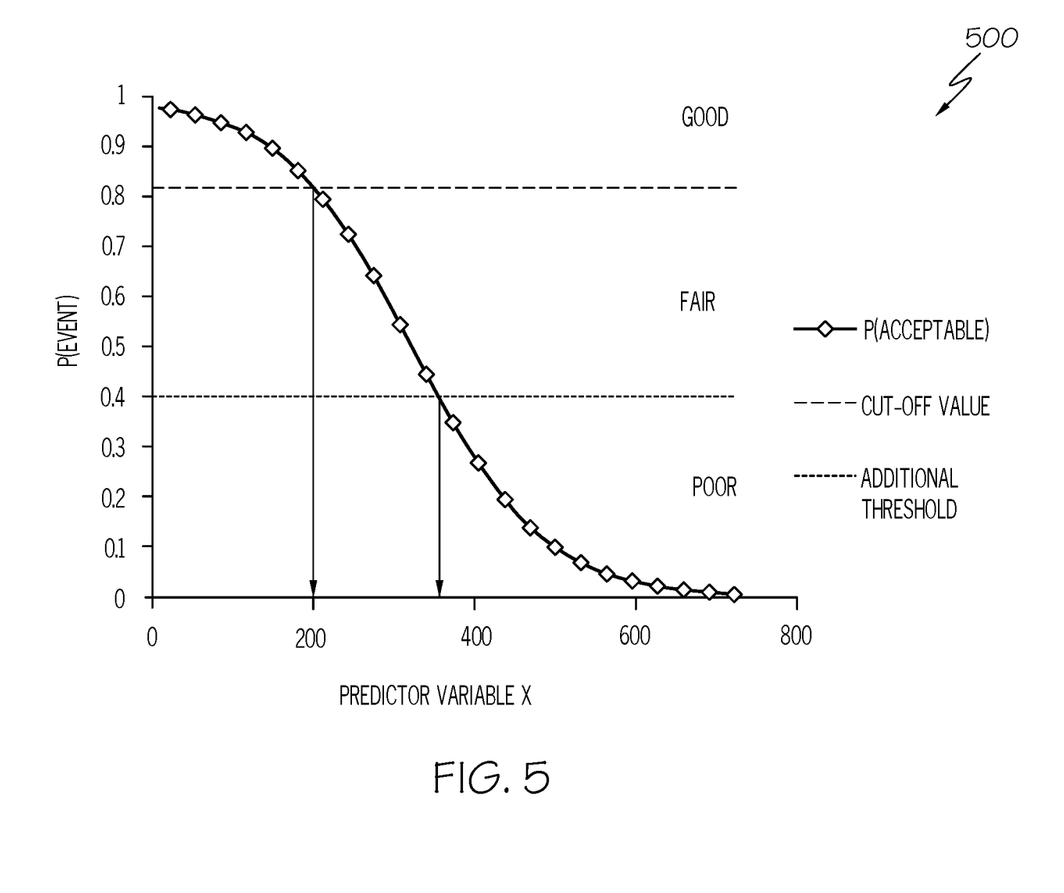
FIG. 5 shows an example probability graph 500 according to an illustrative embodiment of the present invention.

To select parameter values (a, b) that maximize the likelihood of the observed values, the following equation (Eq. 3) may be maximized as shown: Max $\Sigma\_i((\rho(E\_i|a,b)^{\wedge}(W\_i) \cdot (1-\rho(E\_i|a,b)^{\wedge}((1-W\_i)))$. Each historical event is defined with the subscript i with $W_i$ representing the indicator response variable 1=win and 0=loss), and $E_i$ representing the stakeholder's interest (either 'event is of interest' or 'event is not of Interest') for the event i. By using historical data on the accuracy of past outcomes, this model estimates the probability of a stakeholder being interested in the event by reverse fitting a probability function. To develop a model that predicts whether a stakeholder is interested in the event, a dichotomous dependent variable whose value has to be derived from a set of independent predictor variables. S logistic regression model is employed which does not assume multi-normality and also gives an estimate for the probability of a win. The logit model derives the coefficients of the independent variables to predict default probability of occurrence of a dichotomous dependent variable.

In the context of win prediction, the technique weighs the predictor variable and creates a probability that the stakeholder is interested in the event for the given value/range of the predictor variable. The function in logit analysis, called the logistic function, can be written in an equation (Eq. 4) as follows: $〖\rho(Ac)〗\_i = \log [p\_i/(1-p\_i)] = \alpha + \beta\_1 X\_i1 + \beta\_2 X\_i2 + \ldots + \beta\_k X\_ik = X\_i\beta$, where $〖p(Ac)〗\_i$ is the probability that the event is of interest to the party, $p_i$ is the probability of event being of interest, for i event and k predictor variables. The coefficients $\alpha, \beta_1 \ldots \beta_{11}$ of the predictor variables $X_1 \ldots X_k$ are estimated by employing the maximum likelihood method.

Eq. 1 can be transformed using logistic transformation as follows (Eq. 5): $〖p(Ac)〗\_i = e^{\wedge}((X\_i\beta))/(1+e^{\wedge}((X\_i\beta)))$, where the value is $X\_i\beta$ is elaborated by Eq. 2. Modeling the chance that the event is of interest to a stakeholder, a ratio $\theta$ is defined as an odds ratio, represented by equation (Eq. 6) as follows: $\theta = (〖p(Ac)〗\_i)/(1 - 〖p(Ac)〗\_i)$. In an eventuality where, for example, the vehicle insurer is more interested when physical damage to the vehicle has been incurred, the value $X_2$:ES would increase by 1 to get an improvement of pricing model odds as shown in equation (Eq. 7) as follows: $\theta\_new = \theta \cdot e^{\wedge}\beta i$. With Eq. 7, a favorability of the stakeholder being interested in the event can be checked for each predictor variable $X_i$. The odds ratio helps understand the sensitivity such as how much the probability of event being of interest increases with a unit decrease in any of the predictor variables used in the profiling table.

Access component 70 may create a block in a blockchain that captures the event details such as audio/video, surrounding parameters, and/or the like, when the event is of interest to at least one stakeholder. As discussed earlier, transaction data can be permanently recorded in files called blocks.

Blocks can be thought of as the individual pages of a city recorder's recordbook (where changes to title to real estate are recorded) or a stock transaction ledger. Blocks are organized into a linear sequence over time (i.e., the blockchain). For each stakeholder for which the event is of interest, access 70 grant the interested stakeholder access to the blockchain ledger. In an embodiment, to provide access, the stakeholder may be added as a party to the related smart contract.

Figure 6:
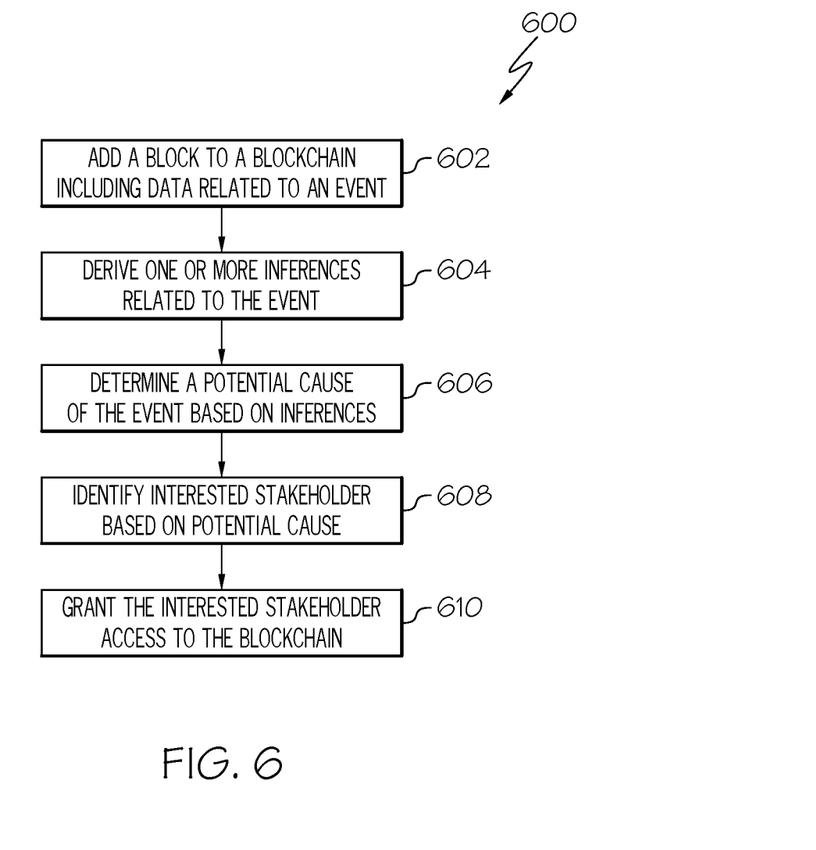
FIG. 6 shows a process flowchart 600 for analyzing blocks in a blockchain ledger following an event to identify an interested stakeholder from among potential stakeholders and granting, based on the analysis, the interested stakeholder access to the blockchain ledger according to an illustrative embodiment of the present invention.

Referring now to FIG. 6, in conjunction with FIG. 3, an implementation of a process flowchart 600 for analyzing blocks in a blockchain ledger following an event to identify an interested stakeholder from among potential stakeholders and granting, based on the analysis, the interested stakeholder access to the blockchain ledger is shown. At step 602, in response to an event, data collector 52 collects data related to the event from various sources (e.g., sensors, cameras, witnesses, etc.) and a block including the collected event data is added to an existing blockchain ledger. At 604, character mapper 62 derives one or more inferences related to the event based on the event data and historical data. At 606, event composition steward 64 constructs a time sequence related to the event including a potential cause of the event based on the inference(s). At 608, access component 70 identifies an interested stakeholder based on the potential cause of the event from among potential stakeholders. At 610, access component 70 grants access to the blockchain to the interested stakeholder.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for analyzing blocks in a blockchain ledger following an event to identify an interested stakeholder from among potential stakeholders and granting, based on the analysis, the interested stakeholder access to the blockchain ledger. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for analyzing blocks in a blockchain ledger following an event to identify an interested stakeholder from among potential stakeholders and granting, based on the analysis, the interested stakeholder access to the blockchain ledger. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for analyzing blocks in a blockchain ledger following an event to identify an interested stakeholder from among potential stakeholders and granting, based on the analysis, the interested stakeholder access to the blockchain ledger. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for automatically fulfilling an obligation under a smart contract, the method comprising:
   adding, by at least one server of a plurality of servers in response to an event that triggers the obligation, a block to a blockchain ledger, wherein the block includes data related to the event collected from a plurality of devices located in a vehicle, including: a telemantics device plugged into an on-board diagnostics (OBD) port of the vehicle, a monitoring camera located within the vehicle, and a smartphone located in the vehicle;

deriving, by the at least one server based on an analysis of event data and historical data incorporated in prior blocks in the blockchain ledger, a set of inferences related to the event by filtering and normalizing the collected data from the plurality of devices located in the vehicle into a structured taxonomy, processing and transforming information collected over time from location-specific sources to the vehicle into a cohesive knowledge base used to derive a context when the event occurs, performing a cognitive analysis on the collected data based on the information in the cohesive knowledge base using a cognitive engine, deriving the set of inferences based on the cognitive analysis of the collected data using predictive analytics-based machine self learning, composing a structured and time-sequenced sequence of events formed from a series of the set of inferences about the structured and time-sequenced event across multiple dimensions based on the cognitive analysis, and identifying any anomalous data points in the set of inferences about the determined sequence of events, wherein the set of inferences includes an assessment of a driver of the vehicle;

automatically determining, by the at least one server based on the set of inferences, a potential cause of the event;

automatically identifying, by the at least one server based on the potential cause of the event, an interested stakeholder to the fulfilling of the obligation among potential stakeholders by determining a probability of the event being of interest to each of the potential stakeholders using an inverse S-shaped curve probability logit function based on a set of parameter values that represent the set of inferences; and automatically adding by the least one server the interested stakeholder to a group that is allowed access to the blockchain ledger corresponding to the smart contract.

2. The method of claim 1, further comprising adding the interested stakeholder as a party to the smart contract.

3. The method of claim 1, wherein the event is a vehicle incident, wherein the vehicle incident involves the vehicle driven by the driver.

4. The method of claim 3, wherein the vehicle incident is a traffic collision.

5. The method of claim 3, further comprising performing a cognitive analysis related to the driver and deriving the set of inferences based on the cognitive analysis.

6. The method of claim 1, further comprising generating an output, as a video, of a time sequence of the event based on the set of inferences and the potential cause of the event.

7. The method of claim 1, wherein the information collected over time from the location-specific sources is selected from the group consisting of: weather data, road condition data, traffic pattern data, and health condition data associated with the vehicle.

8. A computer program product embodied in a computer readable storage medium that, when executed by at least one server of a plurality of servers, performs a method for automatically fulfilling an obligation under a smart contract, the method comprising:

adding, in response to an event that triggers the obligation, a block to a blockchain ledger, wherein the block includes data related to the event collected from a plurality of devices located in a vehicle, including: a telemantics device plugged into an on-board diagnostics (OBD) port of the vehicle, a monitoring camera located within the vehicle, and a smartphone located in the vehicle;

deriving, based on an analysis of event data and historical data incorporated in prior blocks in the blockchain ledger, a set of inferences related to the event by filtering and normalizing the collected data from the plurality of devices located in the vehicle into a structured taxonomy, processing and transforming information collected over time from location-specific sources to the vehicle into a cohesive knowledge base used to derive a context when the event occurs, performing a cognitive analysis on the collected data based on the information in the cohesive knowledge base using a cognitive engine, deriving the set of inferences based on the cognitive analysis of the collected data using predictive analytics-based machine self learning, composing a structured and time-sequenced sequence of events formed from a series of the set of inferences about the structured and time-sequenced event across multiple dimensions based on the cognitive analysis, and identifying any anomalous data points in the set of inferences about the determined sequence of events, wherein the set of inferences includes an assessment of a driver of the vehicle;

automatically determining, based on the set of inferences, a potential cause of the event;

automatically identifying, based on the potential cause of the event, an interested stakeholder to the fulfilling of the obligation among potential stakeholders by determining a probability of the event being of interest to each of the potential stakeholders using an inverse S-shaped curve probability logit function based on a set of parameter values that represent the set of inferences; and automatically adding the interested stakeholder to a group that is allowed access to the blockchain ledger corresponding to the smart contract.

9. The computer program product of claim 8, the method further comprising adding the interested stakeholder as a party to the smart contract.

10. The computer program product of claim 8, wherein the event is a vehicle incident, wherein the vehicle incident involves the vehicle driven by the driver.

11. The computer program product of claim 10, wherein the vehicle incident is a traffic collision.

12. The computer program product of claim 10, the method further comprising performing a cognitive analysis related to the driver and deriving the set of inferences based on the cognitive analysis.

13. The computer program product of claim 8, the method further comprising generating an output, as a video, of a time sequence of the event based on the set of inferences and the potential cause of the event.

14. The computer program product of claim 8, wherein the information collected over time from the location-specific sources is selected from the group consisting of: weather data, road condition data, traffic pattern data, and health condition data associated with the vehicle.

15. A system for automatically fulfilling an obligation under a smart contract, comprising:

a memory medium comprising instructions;

a bus coupled to the memory medium; and a processor, on at least one server of a plurality of servers, coupled to the bus that when executing the instructions causes the system to perform a method, comprising:

adding, in response to an event that triggers the obligation, a block to a blockchain ledger, wherein the block includes data related to the event collected from a plurality of devices located in a vehicle, including: a telematics device plugged into an on-board diagnostics (OBD) port of the vehicle, a monitoring camera located within the vehicle, and a smartphone located in the vehicle;

deriving, based on an analysis of event data and historical data incorporated in prior blocks in the blockchain ledger, a set of inferences related to the event by filtering and normalizing the collected data from the plurality of devices located in the vehicle into a structured taxonomy, processing and transforming information collected over time from location-specific sources to the vehicle into a cohesive knowledge base used to derive a context when the event occurs, performing a cognitive analysis on the collected data based on the information in the cohesive knowledge base using a cognitive engine, deriving the set of inferences based on the cognitive analysis of the collected data using predictive analytics-based machine self learning, composing a structured and time-sequenced sequence of events formed from a series of the set of inferences about the structured and time-sequenced event across multiple dimensions based on the cognitive analysis, and identifying any anomalous data points in the set of inferences about the determined sequence of events, wherein the set of inferences includes an assessment of a driver of the vehicle;

automatically determining, based on the set of inferences, a potential cause of the event;

automatically identifying, based on the potential cause of the event, an interested stakeholder to the fulfilling of the obligation among potential stakeholders by determining a probability of the event being of interest to each of the potential stakeholders using an inverse S-shaped curve probability logit function based on a set of parameter values that represent the set of inferences; and automatically adding the interested stakeholder to a group that is allowed access to the blockchain ledger corresponding to the smart contract.

16. The system of claim 15, wherein the processor when executing the instructions further causes the system to perform the method further comprising adding the interested stakeholder as a party to the smart contract.

17. The system of claim 15, wherein the event is a vehicle incident, wherein the vehicle incident involves the vehicle driven by the driver.

18. The system of claim 17, wherein the vehicle incident is a traffic collision.

19. The system of claim 17, wherein the processor when executing the instructions further causes the system to perform the method further comprising performing a cognitive analysis related to the driver and deriving the set of inferences based on the cognitive analysis.

20. The system of claim 15, wherein the processor when executing the instructions further causes the system to perform the method further comprising generating an output, as a video, of a time sequence of the event based on the set of inferences and the potential cause of the event.

\* \* \* \* \*